US008953526B2

(12) United States Patent
Grant et al.

(10) Patent No.: US 8,953,526 B2
(45) Date of Patent: Feb. 10, 2015

(54) NODE FOR USE IN A MOBILE COMMUNICATIONS NETWORK AND A METHOD OF OPERATING THE SAME

(71) Applicant: Telefonaktiebolaget LM Ericsson (publ), Stockholm (SE)

(72) Inventors: Stephen Grant, Pleasanton, CA (US); Andreas Höglund, Stockholm (SE); Edgar Ramos, Espoo (FI); Yi-Pin Eric Wang, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 232 days.

(21) Appl. No.: 13/703,904

(22) PCT Filed: Oct. 15, 2012

(86) PCT No.: PCT/SE2012/051105
§ 371 (c)(1),
(2) Date: Dec. 13, 2012

(87) PCT Pub. No.: WO2014/021748
PCT Pub. Date: Feb. 6, 2014

(65) Prior Publication Data
US 2014/0105180 A1 Apr. 17, 2014

Related U.S. Application Data

(60) Provisional application No. 61/679,138, filed on Aug. 3, 2012.

(51) Int. Cl.
H04W 52/24 (2009.01)
H04W 36/30 (2009.01)
H04W 76/04 (2009.01)

(52) U.S. Cl.
CPC ............ *H04W 36/30* (2013.01); *H04W 52/244* (2013.01); *Y02B 60/50* (2013.01); *H04W 76/046* (2013.01)
USPC ............................ 370/328; 370/332; 455/444

(58) Field of Classification Search
USPC ............................ 370/328, 331–333; 455/444
See application file for complete search history.

(56) References Cited

U.S. PATENT DOCUMENTS

2005/0176437 A1 8/2005 Mir
2011/0306340 A1* 12/2011 Lindoff et al. ................. 455/434

FOREIGN PATENT DOCUMENTS

EP 1646260 A2 4/2006
WO 03077584 A1 9/2003

OTHER PUBLICATIONS

Peräläet al. "Theory and Practice of RRC State Transitions in UMTS Networks." IEEE 2009. 1-6.
Unknown, Author. "State Transition to CELL_DCH for Uplink Interference Control and Avoidance." Renesas Mobile Europe Ltd. 3GPP TSG-RAN WG1 Meeting #68. R1-120788. Dresden, Germany. Feb. 5-10, 2012. 1-4.

* cited by examiner

Primary Examiner — Hoon J Chung
(74) Attorney, Agent, or Firm — Murphy, Bilak & Homiller, PLLC

(57) ABSTRACT

There is provided a method of operating a node in a mobile communication network, the network comprising a mobile device, a first base station and a second base station, the first base station having a lower transmission power than the second base station and being within the coverage area of the second base station, the method in the node comprising determining (101; 111) whether the mobile device is in an imbalanced region or a part of an imbalanced region between the first base station and the second base station; and determining (103; 113-121) whether to switch the mobile device between a first connection state and a second connection state based on whether the mobile device is located in the imbalanced region or the part of the imbalanced region.

20 Claims, 8 Drawing Sheets

NODE FOR USE IN A MOBILE COMMUNICATIONS NETWORK AND A METHOD OF OPERATING THE SAME

TECHNICAL FIELD

The invention relates to a mobile communications network, and in particular relates to an improved way of managing the operation of mobile communication devices in an imbalanced region of a heterogeneous network, particularly for devices operating in the CELL_FACH state (or similar states in other types of mobile communication networks).

BACKGROUND

Heterogeneous networks are an efficient network deployment solution for satisfying the ever-increasing demand of mobile broadband services. In a heterogeneous network, a low- or lower-power node (LPN), for example a picocell, microcell or femtocell base station (NodeB), is placed in a traffic hot spot within the coverage area of a high- or higher-power node, for example a macrocell base station, to better serve nearby mobile devices. Deploying a low power node in a traffic hot spot may significantly reduce the load in the macro or other higher-power cell covering the area.

The traffic uptake of an LPN however may be somewhat limited. This is due to the transmit power difference between a macro base station (BS) and an LPN, e.g. 40 W vs. 5 W. This is illustrated in FIG. 1. In FIG. 1, the network 2 is shown as comprising a low power node 4 (e.g. picocell or microcell base station) placed within the coverage area of a macrocell base station 6. Each of the LPN 4 and macrocell base station 6 are connected to a radio network controller (RNC) 8 (typically via an Iub interface in UMTS), which in turn connects to a core network 10. As downlink signal strength or quality is used as a basis for triggering a hand over between base stations, the border 12 of the LPN cell is determined by the downlink (DL) signal strength or quality as measured by a mobile communications device 12 (also known as a user equipment—UE). In high speed packet access (HSPA) networks, the quality of the common pilot channel (CPICH) is measured. The border 12 occurs at the point where the downlink signal strength or quality from the LPN 4 is the same as the downlink signal strength or quality from the macrocell base station 6. As the LPN 4 has a much lower transmit power level compared to the macrocell base station 6, the cell border 12 is much closer to the LPN 4 than the macrocell base station 6. However from the uplink (UL) perspective, the base station transmit power difference is irrelevant and the UE 14 would be best served by the base station to which it has the lowest path loss. Thus, for the UL, the cell border should be somewhere near the equal-distance point between the two base stations 4, 6 since at the equal-distance points the path loss from the UE 14 to both base stations 4, 6 is approximately equal.

The region 16 between the UL 'border' and DL border 12 is often referred to as the imbalanced region 16. In the imbalanced region, the UL from the UE 14 would generally be better served by the low-power node 4 (as it is closer to the UE 14 than the macrocell base station 6), but the DL would be better served by the macrocell base station 6. However, as cell selection is determined on the basis of the DL signal quality, a UE 14 in the imbalanced region 16 will generally be served by the macrocell base station 6, meaning that the UE 14 cannot take advantage of the better UL to the LPN 4.

One option for mitigating the imbalance is to extend the range of the LPN 4 by introducing an offset in the process of cell selection/reselection such that a UE 14 in a portion of the imbalance region 16 is served by the LPN 4 rather than the macrocell base station 6. This is referred to as 'range extension'. For example, in a UMTS 3G network, a cell individual offset (CIO) can be used to adjust the cell border for UEs that are in the CELL_DCH state. CIO may be signalled in-band to a UE and thus can be specified for each UE. A UE uses the CIO to bias its mobility measurements (i.e. measurements of the DL signals from the LPN 4 and/or macrocell base station 6). For example, a UE 14 can make use of a weaker cell (i.e. LPN 4 when the UE 14 is in the imbalanced region 16) by applying a large CIO to the measured DL signal quality from the LPN 4. The signal quality can be either the common pilot channel (CPICH) RSCP (received code power) or CPICH $E_c/N_o$ (energy per chip over noise power spectral density ratio).

Cell selection during the UMTS CELL_FACH state (i.e. the UE has no assigned dedicated radio resource) may be based on CPICH RSCP or CPICH Ec/No measurements, and parameters labelled QOffset1sn (for CPICH RSCP measurements) and QOffset2sn (for CPICH $E_c/N_o$ measurements) can be used to bias cell selection. There are other cell selection priority parameters that may be used to give a carrier or cell a higher absolute cell selection priority. Each cell broadcasts the QOffset1sn and QOffset2sn values for use by all UEs 14 in all its neighbouring cells, and the values of QOffset1sn and QOffset2 are coordinated among cells that share the same cell border in order for the cell border to be consistent regardless of the cell in which a UE 14 is located.

FIG. 2 illustrates an example of cell range extension (CRE) in the network of FIG. 1. The DL border 12 corresponds to the conventional situation where no offset is applied to the signal quality measurements. However, if for the cell managed by the LPN 4 an offset is specified, the cell border 12 between the LPN 4 and macrocell base station 6 for UEs being served by the LPN 4 will be moved further from the LPN 4 (indicated by cell border 18).

Thus, moving the cell border 12 to increase the traffic uptake of a low-power node 4 is an attractive enhancement for heterogeneous network deployments. It is beneficial from an UL perspective since the UE 14 will be served by the base station to which the path loss is lower (i.e. the LPN 4 in FIGS. 1 and 2). However, care must be taken not to extend the range too far. Excessive range expansion leads to degradation in the DL performance for a UE 14 served by a low-power node 4 since the received DL power from the serving low-power node 4 in the imbalanced region 16 is weaker than that from the non-serving macrocell base station 6. In addition to the desired signal being weaker, the interference from the macrocell DL is also stronger. Poor DL performance may also impact UL performance since the UL data channel (for example, enhanced-dedicated channel—E-DCH) requires reliable DL signalling (e.g. enhanced-absolute grant channel—E-AGCH, enhanced-relative grant channel—E-RGCH and enhanced-DCH hybrid ARQ indicator channel—E-HIGH). Poor DL performance may also cause handoff problems when the signalling radio bearer (SRB) is carried by the downlink shared channel (HS-DSCH).

To avoid such asymmetric behaviour, some form of UL/DL separation is desirable. Inherently in an HSPA system, this occurs to a certain degree by virtue of uplink soft handover (SHO) that may be configured when the UE is in CELL_DCH state. In uplink soft handover, a UE 14 can be connected to two or more cells, and each cell receives the UL transmissions from the UE 14 and passes them to the RNC 8 which selects the signal with the highest quality. A form of soft handover (referred to herein as extended soft handover) may be employed to leverage the SHO feature to an even greater degree. With extended soft handover, a UE 14 in the imbalanced region 16 continues to be served by the macrocell base station 6. However, in the uplink the UE establishes a connection to both the macrocell base station 6 and LPN 4. This is illustrated in FIG. 1, in which the UL connection from the UE 14 in the imbalanced region 16 to the serving macrocell base station 6 is shown by arrow 20 and the UL connection to the LPN 4 is shown by dashed line 22. In the (extended) SHO region (i.e. the CRE region) the path loss to the LPN 4 is lower than to the macrocell base station 6, hence the power control loop is effectively "steered" by the LPN 4. In this way, a partial UL/DL separation is achieved in that the uplink transmissions are most often decoded correctly at the LPN 4 (due to the lower path loss) while the downlink transmissions still occur from the macrocell base station 6 (which has the highest received quality at the UE 14).

A shortcoming of the (extended) soft handover approach is that it is available only for UEs in CELL_DCH connection state. For UEs 14 operating in the CELL_FACH state (i.e. in which there is no dedicated physical channel allocated to the UE 14), the current standard does not support soft handover in order to maintain the simplicity and reduced overhead of this connection state. Without CRE, a UE 14 in the imbalanced region 16 in CELL_FACH state always connects to the macrocell base station 6, thereby compromising the quality of the uplink. Consideration of the CELL_FACH state is important since this state is primarily useful for short data transmissions which commonly occur with smart phone traffic. It has been found that this type of traffic is already predominant in networks, and is expected to grow further.

SUMMARY

Therefore, there is a need for an improved way of managing the operation of mobile communication devices in an imbalanced region of a heterogeneous network, particularly for devices operating in the CELL_FACH state (or similar states in other types of mobile communication networks).

According to a first aspect, there is provided a method of operating a node in a mobile communication network, the network comprising a mobile device, a first base station and a second base station, the first base station having a lower transmission power than the second base station and being within the coverage area of the second base station, the method in the node comprising determining whether the mobile device is in an imbalanced region or a part of an imbalanced region between the first base station and the second base station; and determining whether to switch the mobile device between a first connection state and a second connection state based on whether the mobile device is located in the imbalanced region or the part of the imbalanced region.

In some implementations, the first connection state is a CELL_FACH state and the second connection state is a CELL_DCH state, and the step of determining comprises determining whether to switch the mobile device between the CELL_FACH state and the CELL_DCH state based on whether the mobile device is located in the imbalanced region or the part of the imbalanced region.

In some preferred implementations, the step of determining comprises determining that the mobile device is to switch into the CELL_DCH state from the CELL_FACH state if the mobile device is located in the imbalanced region or the part of the imbalanced region.

In some implementations, the method further comprises the step of determining whether the mobile device has data to transmit in an uplink to one of the first base station and the second base station; and wherein the decision on whether to switch the mobile device between the first connection state and the second connection state is further based on whether the mobile device has data to transmit.

In some preferred implementations, the first connection state is a CELL_FACH state and the second connection state is a CELL_DCH state, and wherein the step of determining comprises determining that the mobile device is to switch into the CELL_DCH state from the CELL_FACH state if the mobile device is located in the imbalanced region or the part of the imbalanced region and the mobile device has data to transmit.

In alternative implementations, the method further comprises the step of determining the amount of data the mobile device has to transmit in an uplink to one of the first base station and the second base station; and wherein the decision on whether to switch the mobile device between the first connection state and the second connection state is further based on the amount of data the mobile device has to transmit.

In these implementations, the step of determining comprises comparing the amount of data the mobile device has to transmit to a threshold to determine whether to switch the mobile device between a first connection state and a second connection state, the threshold having a first value when the mobile device is located in the imbalanced region or the part of the imbalanced region and a second value when the mobile device is not located in the imbalanced region or the part of the imbalanced region.

In some preferred implementations, the first connection state is a CELL_FACH state and the second connection state is a CELL_DCH state, and wherein the step of determining comprises comparing the amount of data the mobile device has to transmit to a threshold to determine whether to switch the mobile device from the CELL_FACH state to the CELL_DCH state, the threshold having a first value when the mobile device is located in the imbalanced region or the part of the imbalanced region and a second value when the mobile device is not located in the imbalanced region or the part of the imbalanced region, the first value being lower than the second value.

In some implementations, the decision on whether to switch the mobile device between the first connection state and the second connection state is further based on which of the first base station and the second base station the mobile device is camped on.

In some preferred implementations, the first connection state is a CELL_FACH state and the second connection state is a CELL_DCH state, and wherein the step of determining comprises determining to switch the mobile device into the CELL_DCH state from the CELL_FACH state if the mobile device is determined to be located in the imbalanced region or the part of the imbalanced region and is camping on the cell served by the second base station.

In some implementations, the step of determining whether the mobile device is located in the imbalanced region or the part of the imbalanced region comprises receiving a message from the mobile device indicating whether the mobile device is located in the imbalanced region or the part of the imbalanced region.

In other implementations, the step of determining whether the mobile device is located in the imbalanced region or the part of the imbalanced region comprises receiving a measurement report from the mobile device, the measurement report comprising measurements of the quality of downlink signals from the first and/or second base stations to the mobile device; and processing the measurements to determine whether the mobile device is located in the imbalanced region or the part of the imbalanced region.

In alternative implementations, the step of determining whether the mobile device is located in the imbalanced region or the part of the imbalanced region comprises determining which of the first base station and the second base station detect a transmission from the mobile device first.

In yet further alternative implementations, the step of determining whether the mobile device is located in the imbalanced region or the part of the imbalanced region comprises determining the pathloss between the mobile device and each of the first and second base stations; and processing the pathloss to determine whether the mobile device is located in the imbalanced region or the part of the imbalanced region.

In some implementations, the imbalanced region is the region where (i) the quality of downlink signals from the second base station is equal to or greater than the quality of downlink signals from the first base station, and (ii) the quality of uplink signals from the mobile device at the first base station is equal to or greater than the quality of uplink signals from the mobile device at the second base station.

In some implementations, the node is a node that controls the first base station and the second base station. In these implementations, the node can be a radio network controller.

According to a second aspect, there is provided a computer program product, comprising computer readable code embodied therein, the computer readable code being configured such that, on execution by a suitable computer or processor, the computer or processor is configured to perform any of the methods defined above.

According to a third aspect, there is provided a node for use in a mobile communication network, the network comprising a mobile device, a first base station and a second base station, the first base station having a lower transmission power than the second base station and being within the coverage area of the second base station, the node comprising a processing module configured to determine whether the mobile device is in an imbalanced region or a part of an imbalanced region between the first base station and the second base station; and determine whether to switch the mobile device between a first connection state and a second connection state based on whether the mobile device is located in the imbalanced region or the part of the imbalanced region.

Various embodiments of the node are also provided that have a processing module and/or transceiver module configured to perform the steps contained in the above-defined methods. In particular, in some embodiments the node can be a node that controls the first base station and the second base station, such as a radio network controller.

BRIEF DESCRIPTION OF THE DRAWINGS

Embodiments of the invention will now be described, by way of example only, with reference to the following drawings, in which.

DETAILED DESCRIPTION

Although embodiments described below refer to a UMTS mobile communications network, it will be appreciated that the teachings of this application are applicable to other types of network in which nodes of differing transmit power can be deployed.

In addition, although the embodiments described below refer to a picocell base station within the coverage area of a macrocell base station, it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station).

Figure 3:
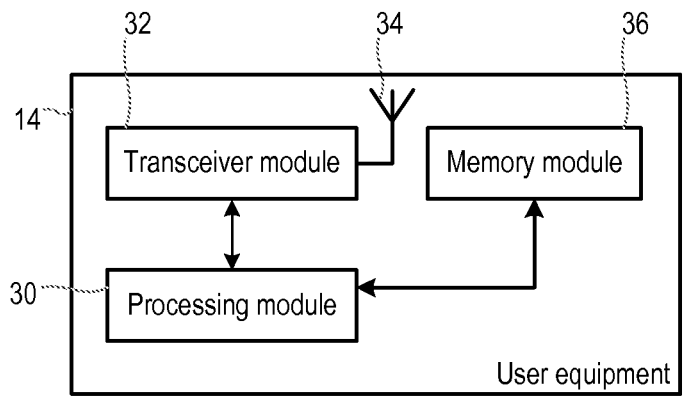
FIG. 3 is a block diagram of a user equipment.

FIG. 3 shows a UE 14 that can be used in, or in conjunction with, one or more of the methods described below. The UE 14 comprises a processing module 30 that controls the operation of the UE 14. The processing module 30 is connected to a receiver or transceiver module 32 with associated antenna(s) 34 which are used to receive signals from a base station 4, 6 in the network 2. The user equipment 14 also comprises a memory module 36 that is connected to the processing module 30 and that stores information and data required for the operation of the UE 14, including data received from the network 2.

Figure 4:
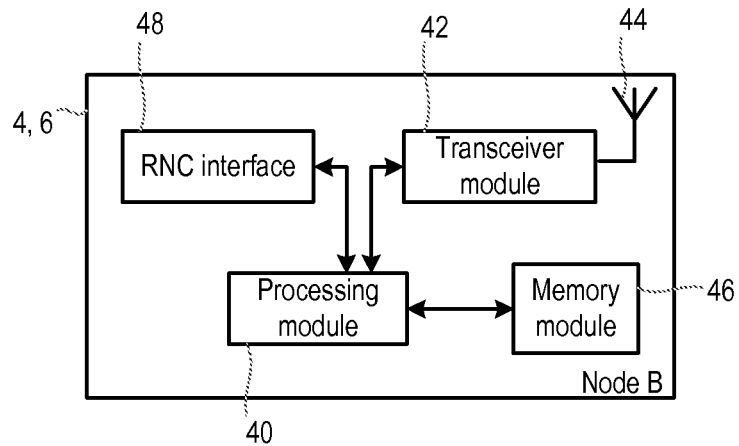
FIG. 4 is a block diagram of a base station.

FIG. 4 shows a base station 4, 6 (called a Node B in UMTS) that can be used in, or in conjunction with, one or more of the methods described below. Although in practice the picocell base station 4 will not be identical in size and structure to the macrocell base station 6, for the purposes of this description, the base stations 4, 6 are considered to comprise the same components. Thus, the base station 4, 6 comprises a processing module 40 that controls the operation of the base station 4, 6. The processing module 40 is connected to a transceiver module 42 with associated antenna(s) 44 which are used to transmit signals to, and receive signals from, user equipments 14 in the network 2. The base station 4, 6 also comprises a memory module 46 that is connected to the processing module 40 and that stores information and data required for the operation of the base station 4, 6. The base station 4, 6 also includes components and/or circuitry 48 for allowing the base station 4, 6 to exchange information with the RNC 8 (which is typically via the Iub interface).

Figure 5:
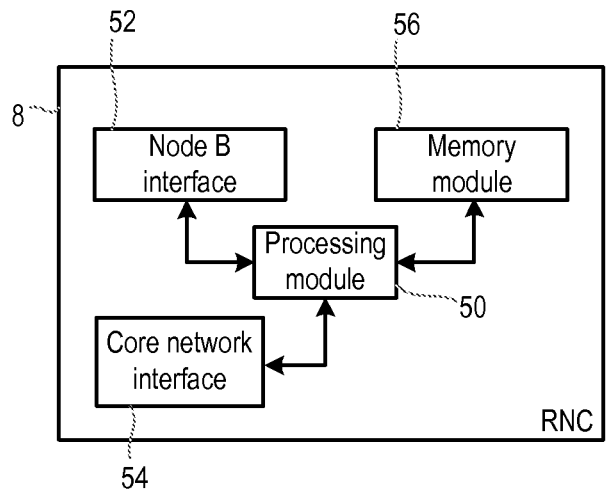
FIG. 5 is a block diagram of a radio network controller.

FIG. 5 shows a radio network controller (RNC) 8 that can be used in one or more of the embodiments described below. The RNC 8 comprises a processing module 50 that controls the operation of the RNC 8. The processing module 50 is connected to components and/or circuitry 52 for allowing the RNC 8 to exchange information with the base stations 4, 6 with which it is associated (which is typically via the Iub interface), and components or circuitry 54 for allowing the RNC 8 to exchange information with the core network 10 (which is typically via the Iu-CS and/or Iu-PS interface). The RNC 8 also comprises a memory module 56 that is connected to the processing module 50 and that stores information and data required for the operation of the RNC 8.

It will be appreciated that, for simplicity, only components of the UE 14, Node B 4, 6 and RNC 8 required to illustrate the methods described below are shown in FIGS. 3, 4 and 5.

Figure 6:
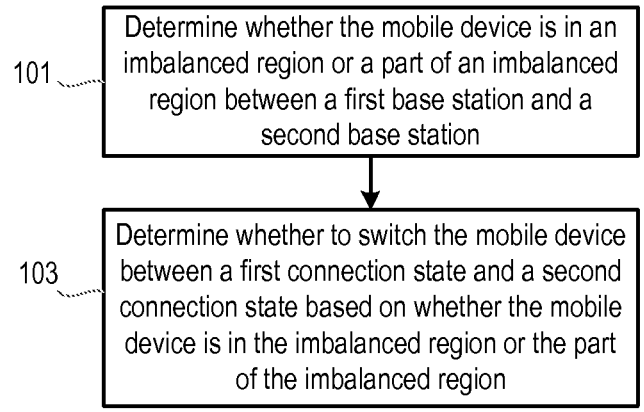
FIG. 6 is a flow chart illustrating a method of operating a node according to a general embodiment.

The flow chart in FIG. 6 illustrates one embodiment of a method of operating a node in a mobile communication network 2 to improve the management of mobile communication devices 14 in an imbalanced region 16 of a heterogeneous network. The method can be implemented in a base station or in a node that controls the operation of one or more base stations, such as a radio network controller 8. The heterogeneous network comprises first and second base stations, with the first base station having a lower transmission power than the second base station and being within the coverage area of the second base station. The first base station is thus a lower-power node 4 relative to the second base station 6. Mobile devices 14 in the network 2 can be in one of a plurality of possible connection states, with the specific state depending on the resources the mobile device 14 requires in its communications. For example, possible connection states are the CELL_FACH and CELL_DCH states. CELL_FACH is a state that is typically used when a mobile device 14 has small and/or infrequent amounts of data to transmit and/or receive, and a mobile device 14 in this state will not have any dedicated physical connections with the serving base station. CELL_DCH is a state that is typically used when a mobile device 14 has large amounts and/or frequent amounts of data to transmit and/or receive, and a mobile device 14 in this state will have a dedicated physical channel with the serving cell. CELL_DCH is thus a more radio resource-intensive state than CELL_FACH.

In a first step, step 101, the node determines whether the mobile device 14 is in an imbalanced region 16 or a part of an imbalanced region between the first base station 4 and the second base station 6.

As described above, the imbalanced region 16 is the region where the quality of downlink signals from the second base station 6 is equal to or greater than the quality of downlink signals from the first base station 4, and the quality of uplink signals from the mobile device 14 at the first base station 4 is equal to or greater than the quality of uplink signals from the mobile device 14 at the second base station 6. The part of the imbalanced region 16 can be the region from the DL border 12 to the end of the range extension region. Exemplary techniques and methods for determining whether the mobile device 14 is in the imbalanced region or part of the imbalanced region are described below with reference to FIGS. 9-12.

Then, in step 103, the node determines whether to switch or transition the mobile device 14 from the current connection state of the mobile device 14 to another connection state based on whether the mobile device 14 is in the imbalanced region 16 or the part of the imbalanced region 16. If the node determines to switch or transition the mobile device 14 to a new connection state, the node can then effect this switch or transition.

In some embodiments, the node can determine to switch or transition the mobile device 14 to a more resource-intensive state if the mobile device 14 is determined to be in the imbalanced region 16 or the part of the imbalanced region 16. For example, the node can determine that a mobile device 14 that is in the CELL_FACH state and is in the imbalanced region 16 or the part of the imbalanced region 16 should be switched into the CELL_DCH state. In this particular case, promoting a mobile device 14 to the CELL_DCH state can allow extended soft handover to be established, thus improving the uplink performance as well as achieving a degree of UL/DL separation. While the radio resource consumption of a mobile device 14 in the CELL_DCH state is larger than in the CELL_FACH state, a large number of mobile devices 14 may still be supported in the cell since the fraction of mobile devices 14 in the imbalanced region 16 or the part of the imbalanced region 16 is not likely to be large. Furthermore, higher resource consumption in a lower-power base station 4 is not likely to be a problem when the base station 4 is lightly loaded. By having the power control loop effectively "steered" by the lower-power base station 4 after the mobile device 14 is switched to the CELL_DCH state and soft handover established, the uplink rise-over-thermal (RoT) in both the first and second base stations can actually be reduced.

In some embodiments, following such a transition, the node can determine whether to switch the mobile device 14 back to a less resource-intensive state (e.g. CELL_FACH) if the mobile device 14 is no longer in the imbalanced region 16 or the part of the imbalanced region 16.

In some embodiments, as described further below, the decision on whether to switch or transition the mobile device 14 from one state to another can also take into account information on whether the mobile device 14 has data to transmit.

Figure 1:
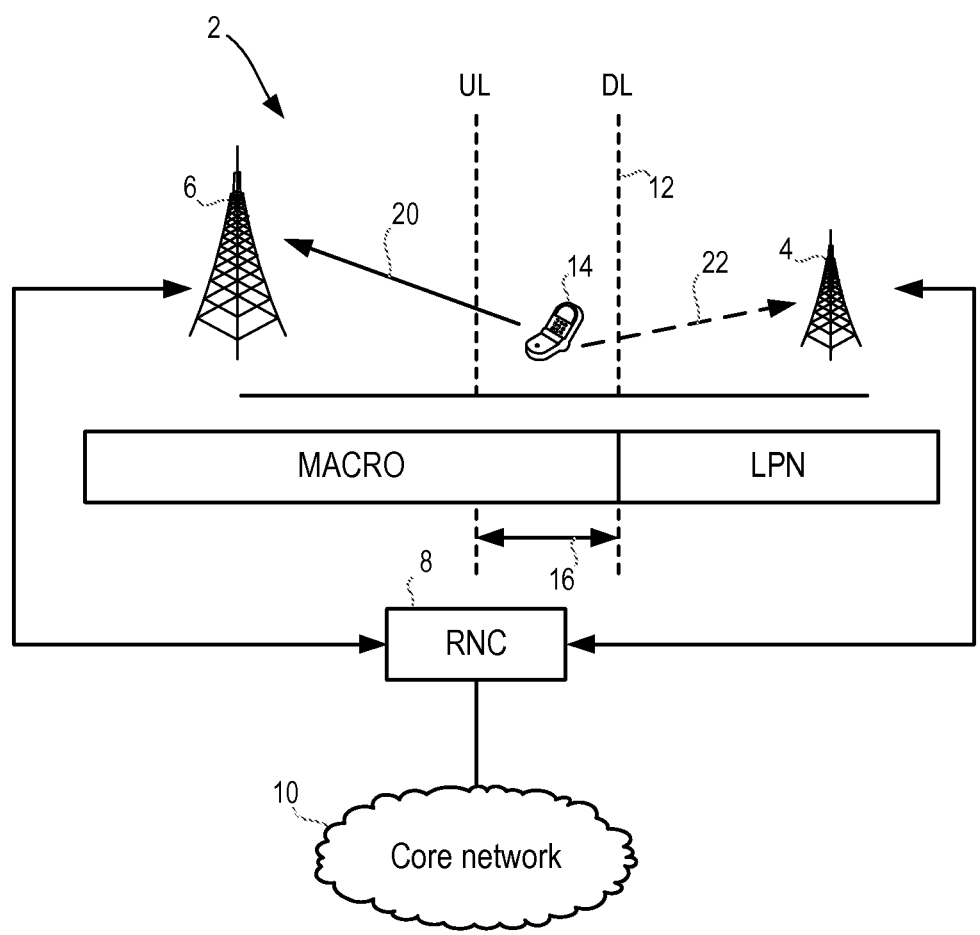
FIG. 1 is an illustration of a network.
Figure 2:
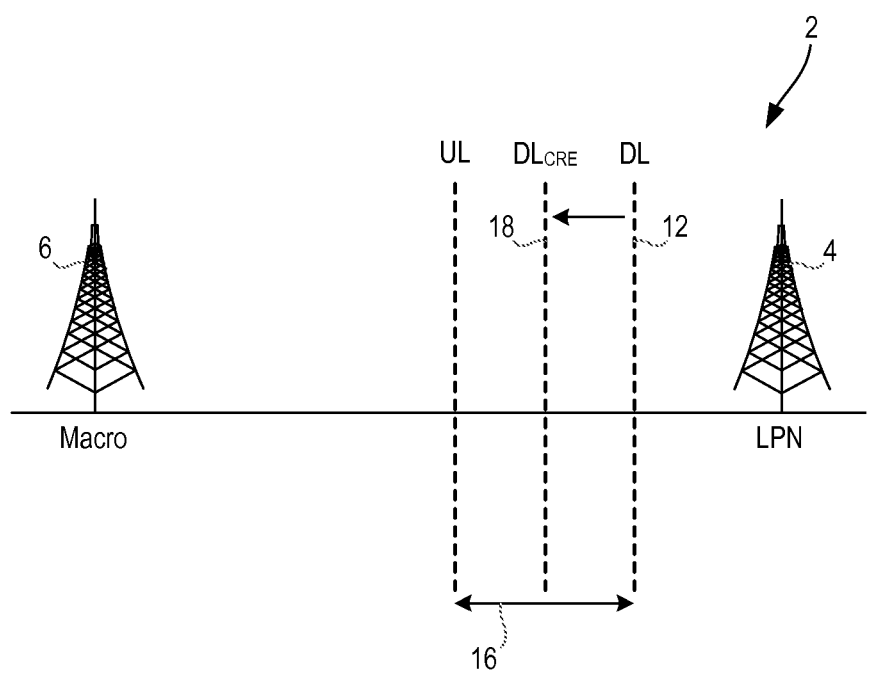
FIG. 2 illustrates the movement of a cell border using an offset value.
Figure 7:
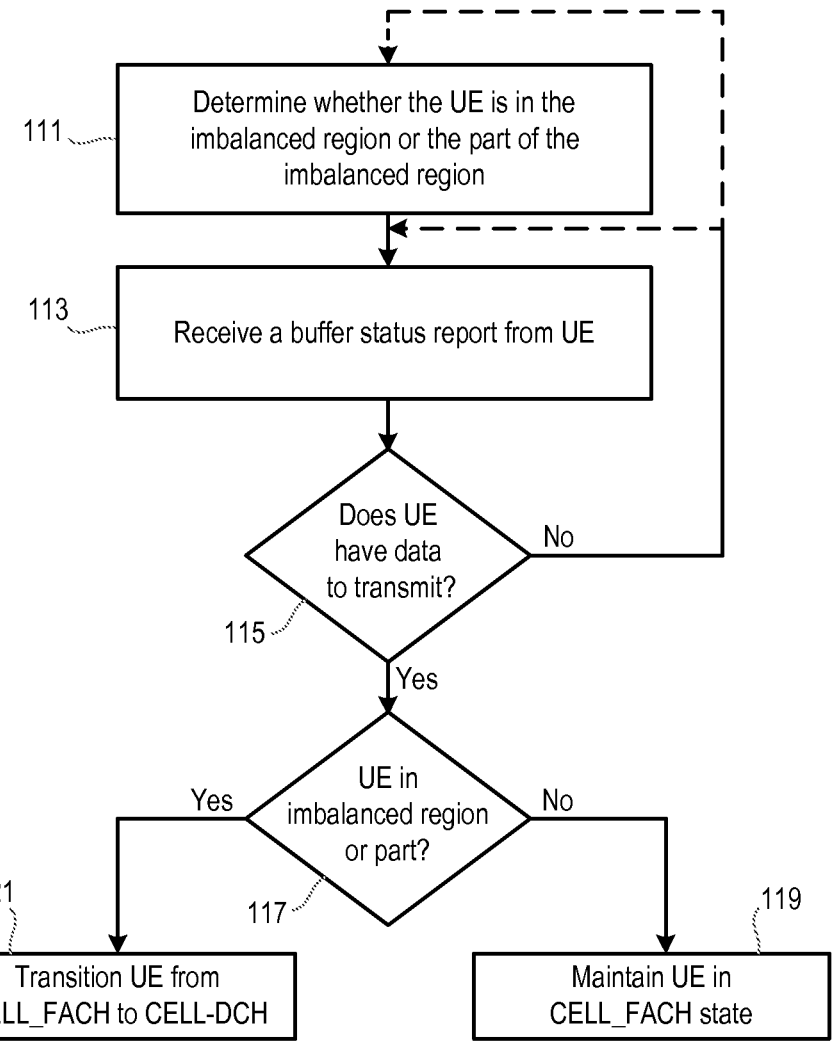
FIG. 7 is a flow chart illustrating a method of operating a radio network controller according to a specific embodiment.

The flow chart in FIG. 7 illustrates a method of operating a radio network controller, RNC, 8 in an HSPA network in accordance with a specific embodiment. At the start of this method, it is assumed that the mobile device (UE) 14 is in the CELL_FACH state and is currently being served by a macrocell base station 6 (i.e. the UE 14 is not the picocell base station 4 side of the DL border 12 in FIG. 1). The RNC 8 will know which of the macrocell base station 6 and picocell base station 4 is the serving node for the UE 14.

In a first step, step 111, the RNC 8 determines whether the UE 14 is in the imbalanced region 16 or the part of the imbalanced region 16. As with step 101 above, this step can be performed using one or more of the exemplary techniques and methods described below with reference to FIGS. 9-12.

In step 113 (which, although illustrated as occurring after step 111, may occur at the same time or before step 111), the RNC 8 receives information on whether the UE 14 has data to transmit. This information can be in the form of a buffer status report, which indicates the amount of data waiting to be transmitted by the UE 14.

Then, in step 115, the RNC 8 analyses the buffer status report to determine whether the UE 14 has data to transmit (or, in some embodiments, an amount of data to transmit greater than a threshold amount). If the UE 14 does not have data to transmit (or a large enough amount of data to transmit), the method can return to step 111 or 113.

If the UE 14 does have data to transmit (or a large enough amount of data to transmit), the method moves to step 117 which uses the determination from step 111 as to whether the UE 14 is in the imbalanced region 16 or the part of the imbalanced region 16. If the UE 14 is not in the imbalanced region 16 or the part of the imbalanced region 16, then the RNC 8 maintains the UE 14 in the CELL_FACH state (step 119).

However, if the UE 14 is in the imbalanced region 16 or the part of the imbalanced region 16, then the RNC 8 can initiate or effect a transition of the UE 14 from the CELL_FACH state to the CELL_DCH state (step 121).

In an alternative implementation, the RNC 8 can maintain a data buffer threshold that is used in determining whether to initiate a switch from CELL_FACH to CELL_DCH, the value of which depends on the location of the mobile device 14 (i.e. in the imbalanced region 16 or part of the imbalanced region 16, or not). In particular, the RNC 8 can compare the amount of data indicated in the buffer status report received from the mobile device 14 to the data buffer threshold to determine whether to switch the mobile device 14 from CELL_FACH to CELL_DCH. The data buffer threshold can have a first value when the mobile device 14 is in the imbalanced region 16 or the part of the imbalanced region 16, and a second value when the mobile device 14 is not in the imbalanced region 16 or the part of the imbalanced region 16. To encourage mobile devices 14 to be switched to the CELL_DCH state more readily in the imbalanced region 16 or part of the imbalanced region 16, the first value is preferably lower than the second value.

Figure 8:
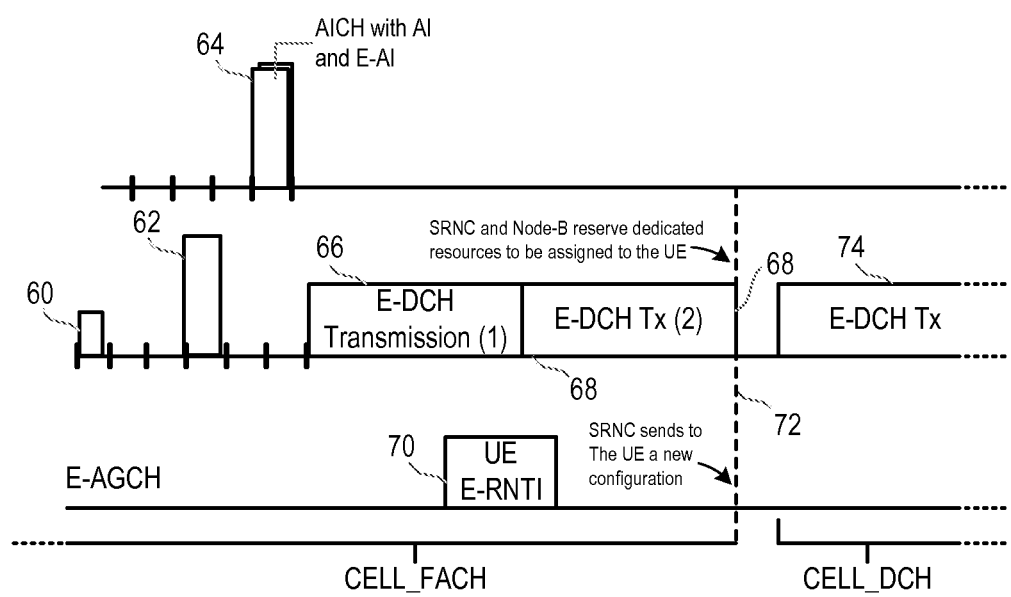
FIG. 8 is a signalling diagram illustrating the transition of a UE in CELL_FACH state to CELL_DCH state.

FIG. 8 illustrates the transition from CELL_FACH to CELL_DCH state for a UE 14 served by a macrocell base station 6. The middle time-line in FIG. 8 represents signalling from the UE 14. The UE 14 initiates a data transmission by transmitting a RACH preamble sequence 60, 62 at increasing power levels, until the macrocell base station 6 responds with an acquisition indicator (AI) 64 over the AI channel (AICH—represented by the top time-line in FIG. 8). The AICH indicates which common E-DCH (data channel) resources are to be used by the UE 14. The UE then begins its E-DCH transmission 66 using these common resources (scrambling code, channelisation codes, transport format). The UE 14 continues data transmission (data block 68) once the UE 14 receives a message 70 over the absolute grant channel (E-AGCH—represented by the bottom time-line in FIG. 8) indicating that the UE 14 is indeed the one assigned to these common resources, i.e. is allowed to transmit. The indicator is the so-called E-RNTI (Radio Network Temporary Identifier). At this point, the serving RNC (SRNC) may take the decision (in step 121 of FIG. 7) to upswitch the UE 14 to the CELL_DCH state. Once that decision is made, the RNC 8 indicates the upswitch to the UE 14 through radio resource control, RRC, signalling. The upswitch takes place at the time represented by dashed line 72, and is the time at which the dedicated resources are reserved for the UE 14 by the RNC 8 and the serving base station (macrocell base station 6). After the upswitch, the UE 14 continues transmitting data (with data transmission 74) with the dedicated E-DCH resources.

In a network where (extended) soft handover can be used, after transitioning to the CELL_DCH state, the UE 14 will be placed in (extended) soft handover by means of the conventional procedures.

In some embodiments, if following the upswitch to CELL_DCH the UE 14 leaves the imbalanced region 16 or the part of the imbalanced region 16, the RNC 8 can effect a transition of the UE 14 back to the CELL_FACH state (unless the UE 14 has sufficient data to transmit to justify being in the CELL_DCH state according to conventional procedures).

Exemplary Techniques for Determining when the Mobile Device 14 is in the Imbalanced Region 16 or a Part of the Imbalanced Region 16 (e.g. The Range Extension Region)

The techniques and methods described below and illustrated with reference to FIGS. 9-12 are exemplary techniques and methods for determining when the UE 14 is in the imbalanced region, or when the UE 14 is in part of the imbalanced region up to the end of a 'range extension' region (as set by an offset value that is applied to the signal quality measurements for transmissions between the UE 14 and the LPN 4).

Figure 9:
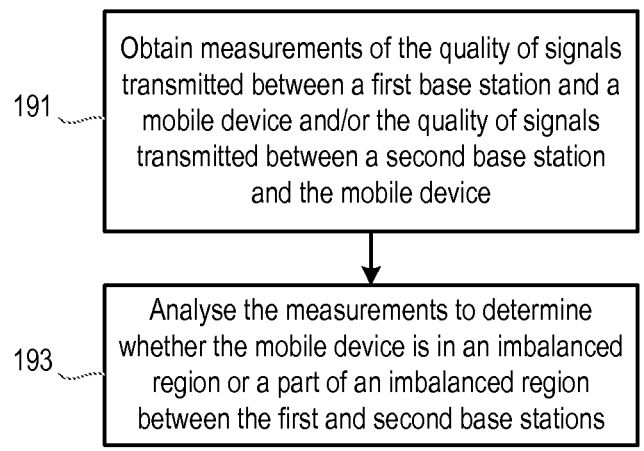
FIG. 9 is a flow chart illustrating an exemplary method of operating a mobile device to determine whether a mobile device is in an imbalanced region or a part of an imbalanced region.

The flow chart of FIG. 9 shows an exemplary method of operating a mobile device (UE) 14 in a heterogeneous network 2 to enable a node in the network to determine whether the UE 14 is in an imbalanced region 16 or a part of the imbalanced region 16. In a first step, step 191, measurements of the quality of signals transmitted between a first base station (e.g. picocell base station 4) and the mobile device 14 and/or a second base station (e.g. macrocell base station 6) and the mobile device 14 are obtained. Then, in step 193, these measurements are analysed to determine whether the mobile device 14 is in an imbalanced region 16 or part of an imbalanced region 16 between the first and second base stations 4, 6.

Figure 10:
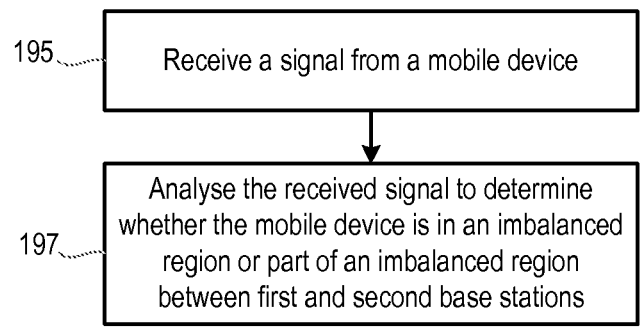
FIG. 10 is a flow chart illustrating an exemplary method of operating a node in the network to determine whether a mobile device is in an imbalanced region or a part of an imbalanced region.

The flow chart of FIG. 10 shows an exemplary method of operating a node in the network 2, such as picocell base station 4, macrocell base station 6 and/or RNC 8. In a first step, step 195, a signal is received from a mobile device 14. This signal is analysed in step 197 to determine whether the mobile device 14 is in an imbalanced region 16 or part of an imbalanced region 16 between first and second base stations 4, 6. Specific implementations of the method in FIG. 10 are described in more detail below.

In many cases, additional overhead (e.g. signalling) in terms of the sending of measurement reports from the UE 14 should be minimised, which means the UE 14 ideally should not continuously inform the network 2 of the experienced quality of its measured cells or of its position in relation to an imbalanced region 16. However, in some cases the UE 14 may do this. Hence, in a first specific method, described with reference to FIG. 11 below, UEs 14 are configured to notify the network 2 when they have entered or left the imbalanced region 16 or the specified part of the imbalanced region 16 (i.e. the range extension region). In this method, the network 2 will have full awareness of which UEs 14 are located in an imbalanced region 16 or range extension region. In a second specific method, described with reference to FIG. 12 below, UEs 14 are configured to inform the network 2 of their location with respect to an imbalanced region 16 or part of the imbalanced region 16 at the start of a data transmission. In this method, the amount of additional signalling is minimised since UEs 14 only transmit a measurement report or location indicator when there is data to be transmitted.

Figure 11:
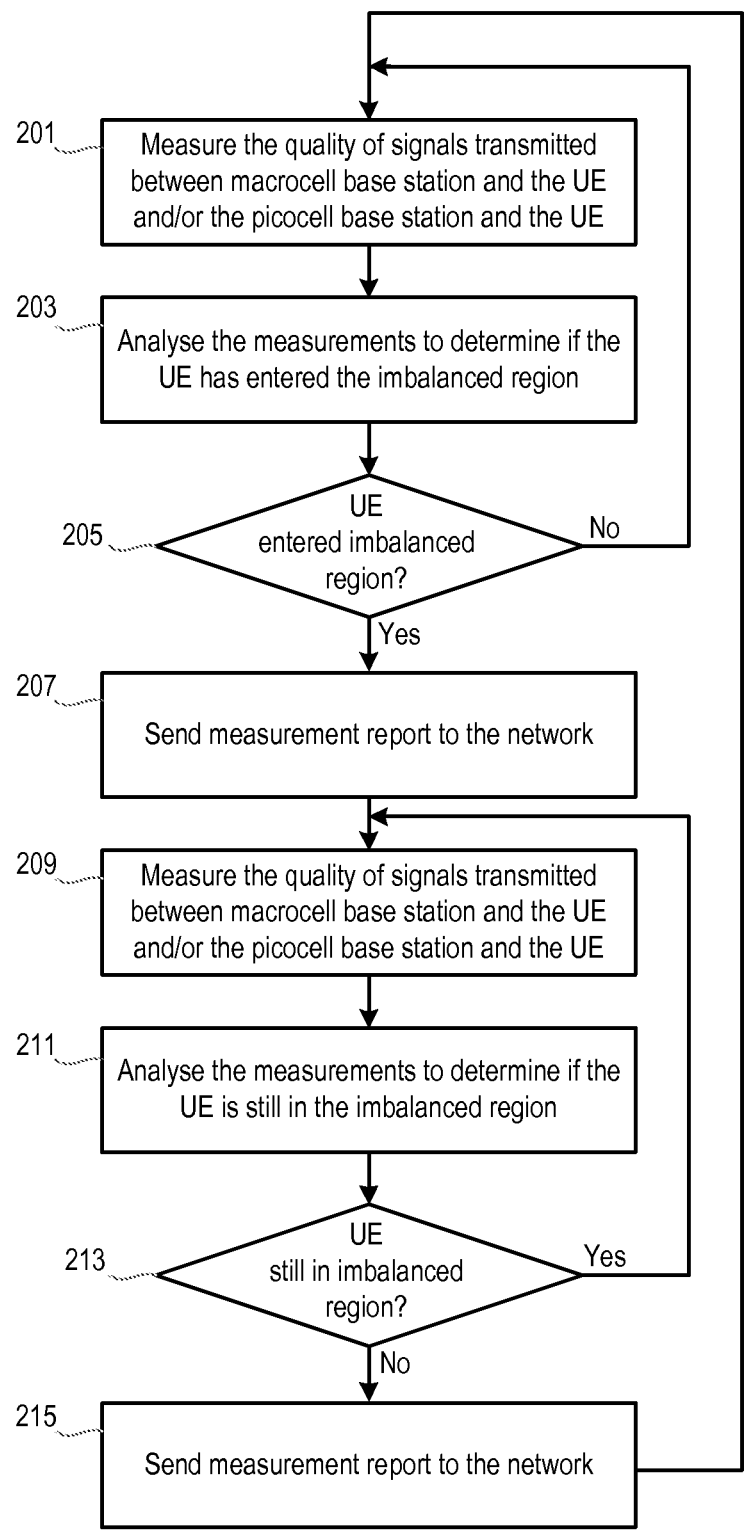
FIG. 11 is a flow chart illustrating a first specific method of operating a user equipment to determine whether the user equipment is in an imbalanced region or a part of an imbalanced region.

A method of operating a UE 14 according to a first method for determining whether the UE 14 is in the imbalanced region or a part of the imbalanced region is shown in FIG. 11. In step 201, the UE 14 measures the quality of signals transmitted between the UE 14 and nearby base stations 4, 6. For the purposes of this method, it is assumed that the UE 14 measures the quality of signals transmitted between the UE 14 and at least one of a picocell base station 4 and an overlying macrocell base station 6. It is also assumed at step 201 that the UE 14 is not yet in the imbalanced region 16. If the UE 14 is already in the imbalanced region 16, the method can alternatively commence at step 209.

In step 201 the UE 14 preferably measures the quality of downlink signals from at least one of the picocell base station 4 and the macrocell base station 6. The signals are received by the antenna(s) 34 and receiver module 32 in the UE 14 and passed to the processing module 30 for the processing module 30 to determine the quality measurements.

The downlink signals received by the UE 14 can be the common pilot channel (CPICH), and the quality measurement can be the CPICH received signal code power (RSCP) and/or the CPICH $E_c/N_o$ (which is the ratio of the received energy per PN chip for the CPICH to the total received power spectral density at the UE 14).

Then, in step 203, the UE 14 analyses the measurements to determine if the UE 14 has entered the imbalanced region 16. As described above, the imbalanced region 16 is the region in a heterogeneous network deployment between a higher-power node 6 and a lower-power node 4 where, for a UE 14 in this region 16, the higher-power node 6 is the strongest or best cell for the DL to the UE 14, but the lower-power node 4 is the strongest or best cell for the UL from the UE 14.

Since it can be difficult for a UE 14 to determine and keep track of the best cell for the UL from the UE 14, it is preferable for the UE 14 to determine whether it is in the imbalanced region 16 based on measurements of DL quality only. In some methods, the imbalanced region 16 can be defined as any location x where the following relationship is satisfied:

$$x: 0 \leq F_{macro}(x) - F_{pico}(x) \leq P_{diff} \quad (1)$$

where the function F represents the DL quality measurement at location x from a particular cell (either in terms of RSCP or $E_c/N_0$ in dB with regards to the CPICH), and $P_{diff}$ is the difference (in dB) in the transmission power of the macrocell base station 6 CPICH and the picocell base station 4 CPICH. The location x where $F_{macro}(x) - F_{pico}(x) = 0$ corresponds to the DL border 12, and the location x where $F_{macro}(x) - F_{pico}(x) = P_{diff}$ corresponds to the UL border. In some implementations, if the DL quality measurement F is based on CPICH $E_c/N_0$, the threshold for the UL border can be set as $P_{diff} + \Delta$, where $\Delta$ can be a small positive or negative number and is used to account for the difference in total interference levels experienced by the picocell CPICH versus the macrocell CPICH. The value for $\Delta$ may be predetermined.

$P_{diff}$ is straight forward to calculate in the UE 14 since the primary CPICH transmission power for each of the base stations 4, 6 is communicated to the UE 14. The original purpose of this signalling is so that the UE 14 can estimate the pathloss from each of the base stations 4, 6 which enables the UE to perform random access. The transmission of information on the primary CPICH transmission power is detailed in section 10.3.6.61 of 3GPP specification 25.331 v10.8 June 2012.

Where the UE 14 is to determine whether it is in a part of the imbalanced region 16, such as a part extending from the DL border 12 up to the end of a range extension region, the UE 14 can use the following relationship in step 203:

$$x: 0 \leq F_{macro}(x) - F_{pico}(x) \leq RE \quad (2)$$

where RE is the amount of offset to be applied to quality measurements of the DL signals from the picocell base station 4. Typically, the range extension region forms a subset of the full imbalanced region 16 (i.e. $RE \leq P_{diff}$). In this case, the picocell range can be expanded all the way up to the UL border. However, in some cases, expanding the picocell range beyond the imbalanced region 16 can be desirable, i.e. $RE > P_{diff}$.

The amount of range extension to be applied to a particular low-power cell (i.e. the value of RE) is communicated to the UE 14 so that it can be used in cell selection/reselection decisions (when the UE 14 is in a CELL_FACH state) or in triggering the issue of a measurement report to the network 2 (when the UE 14 is in a CELL_DCH state). In CELL_DCH, the hand over is event triggered by the UE 14 (event 1d in section 10.3.7.39 in 3GPP specification 25.331 v10.8 June 2012) and the UE 14 must therefore be aware of any bias or offset used for the cell reselection, typically denoted the Cell Individual Offset (CIO). In CELL_FACH the hand over is UE centred and therefore the UE 14 must know any bias or offset, typically denoted qOffset1sn or qOffset2sn, for the camping cell reselection. Thus, the UE 14 will be aware of the value of RE when step 203 is to be performed.

However, in both cases above (i.e. when using relationship (1) or (2)), any offsets such as the CIO for CELL_DCH or qOffset1/2sn for CELL_FACH will typically not be included in the calculation of F. It is, for example, desirable for the UE 14 to inform the network 2 when the UE 14 is at the DL border 12 even when offsets are used to achieve range extension for the picocell 4.

As an alternative to the definitions provided in equations (1) and (2) above, the imbalanced region 16 can be defined in terms of the pathgain on the UL from the UE 14 to the picocell base station 4 and the macrocell base station 6. In this case, the imbalanced region 16 can be defined as any location x where the following relationship is satisfied $$x: 0 \leq G_{pico}(x) - G_{macro}(x) \leq P_{diff} \quad (3)$$

where the function G represents the pathgain at location x for a particular cell in dB, and $P_{diff}$ is the difference in the CPICH transmission power of the macrocell base station 6 and the picocell base station 4. The pathgain G on the UL is the inverse of the DL pathloss from a base station 4, 6 to the UE 14, and so the pathgain G can be calculated by the UE 14 as the measured DL CPICH RSCP for a cell divided by the CPICH transmission power for that cell. The location x where $G_{pico}(x) - G_{macro}(x) = 0$ corresponds to the UL border, and the location x where $G_{pico}(x) - G_{macro}(x) = P_{diff}$ corresponds to the DL border 12.

Similarly, an alternative relationship that can be used to determine if the UE 14 is in the range extension region is:

$$x: RE \leq G_{pico}(x) - G_{macro}(x) \leq P_{diff} \quad (4)$$

where RE is the amount of offset to be applied to quality measurements of the DL signals from the picocell base station 4.

It will be appreciated from the above that the imbalanced region 16 can alternatively be defined using a combination of DL signal quality F and the pathgain G (for example the imbalanced region 16 could correspond to any location x where x: $0 < F_{macro}(x) - F_{pico}(x) < P_{diff}$ and $0 < G_{pico}(x) - G_{macro}(x) < P_{diff}$).

In another alternative, where the UE 14 only measures the signal quality (preferably the RSCP) of the CPICH from the picocell base station 4, the imbalanced region 16 or the range extension region can correspond to a location x where:

$$x: a \leq F_{pico}(x) \leq b \quad (5)$$

with a being a lower threshold and b being an upper threshold. The values of a and b can be optimised according to the power with which the picocell base station 4 and macrocell base station 6 transmit the CPICH.

For example, a network operator can identify the imbalanced region 16 or the range extension region according to equation (1) or (2) by using a test mobile device to measure the signal quality at a number of locations in the network coverage area. Then, the network operator can obtain the upper bound b and lower bound a on $F_{pico}(x)$ based on the measurement data collected by the test mobile device in the identified imbalanced region 16 or the range extension region. The upper and lower bounds can be stored in the RNC 8 and used to classify whether UE 14 is in the imbalanced region 16 or the range extension region based on the UE's measurement $F_{pico}(x)$. Alternatively, instead of using the lower bound for the value of a and upper bound for the value of b, the mean of the lowest 10-percentile of $F_{pico}(x)$ measurements from the test mobile device in the identified imbalanced region 16 or the range extension region can be used as the value of a and the mean of the highest 10-percentile of $F_{pico}(x)$ measurements from the test mobile device in the identified imbalanced region 16 or the range extension region can be used as the value of b.

After step 203, it is determined in step 205 whether the UE 14 has entered the imbalanced region 16 (or range extension region). In other words, it is determined whether the UE 14 is now in the specified region (i.e. the imbalanced region 16 or range extension region) whereas previously it was outside the region. If the UE 14 has not entered the region, the method returns to step 201 and repeats.

If it is determined that the UE 14 has entered the specified region, then the method moves to step 207 in which the UE 14 sends a message to the network 2 to inform the network 2 that the UE 14 is now in the region. In some implementations, this message is a measurement report that contains the signal quality measurements made by the UE 14 on the downlink signals from the picocell base station 4 and/or macrocell base station 6 (and optionally the signal quality measurements of any other nearby cells). In some implementations, a new event identity (ID) can be defined for the event of the UE 14 entering the imbalanced region 16, and on occurrence of the event the UE 14 can be configured to transmit the required message or measurement report.

As described below with reference to FIG. 10, a node in the network 2 (for example the picocell base station 4, macrocell base station 6 or RNC 8) can process the signal quality measurements in the measurement report to determine whether the UE 14 is in the imbalanced region 16 or range extension region.

In alternative implementations, the transmission of the message or measurement report itself can indicate to the node in the network 2 that the UE 14 is in the specified region (e.g. the imbalanced region 16 or part of the imbalanced region 16 between the picocell base station 4 and the macrocell base station 6)—i.e. the UE 14 can be configured to only send the message or measurement report when it has entered the imbalanced region 16 or range extension region.

After the transmission of the measurement report or other message to the network 2 in step 207, the method moves to step 209 in which the UE 14 continues to measure the quality of the downlink signals from the picocell base station 4 and macrocell base station 6. These measurements are then analysed in step 211 to determine if the UE 14 is still in the imbalanced region 16. It will be appreciated that the implementation of steps 209 and 211 is similar, if not the same as, steps 201 and 203 described above.

In step 213, it is determined whether the UE 14 is still in the imbalanced region 16 (or range extension region). If the UE 14 is still in the specified region, the method returns to step 209. If it is determined that the UE 14 is no longer in the specified region, the method moves to step 215 in which a measurement report or other message is sent to the network 2 by the UE 14 indicating that the UE 14 is no longer in the imbalanced region 16 or range extension region. As in step 207, the measurement report can indicate the signal quality measurements for the nearby cells 4, 6, the measurement report can be a dedicated message that is only sent when the UE 14 has left the specified region. Once the message or measurement report has been sent to the network 2, the method returns to step 201.

Although this implementation has the drawback that messages or measurement reports will be transmitted by the UE 14 when there is no data being transmitted by the UE 14 (for example when the UE is in CELL_FACH state or in DTX/DRX in the CELL_DCH state), resulting in some signalling overhead, it provides the advantage that the network 2 (for example the RNC 8) has full knowledge of exactly which and how many UEs 14 are located in the imbalanced region 16 or range extension region at all times.

Figure 12:
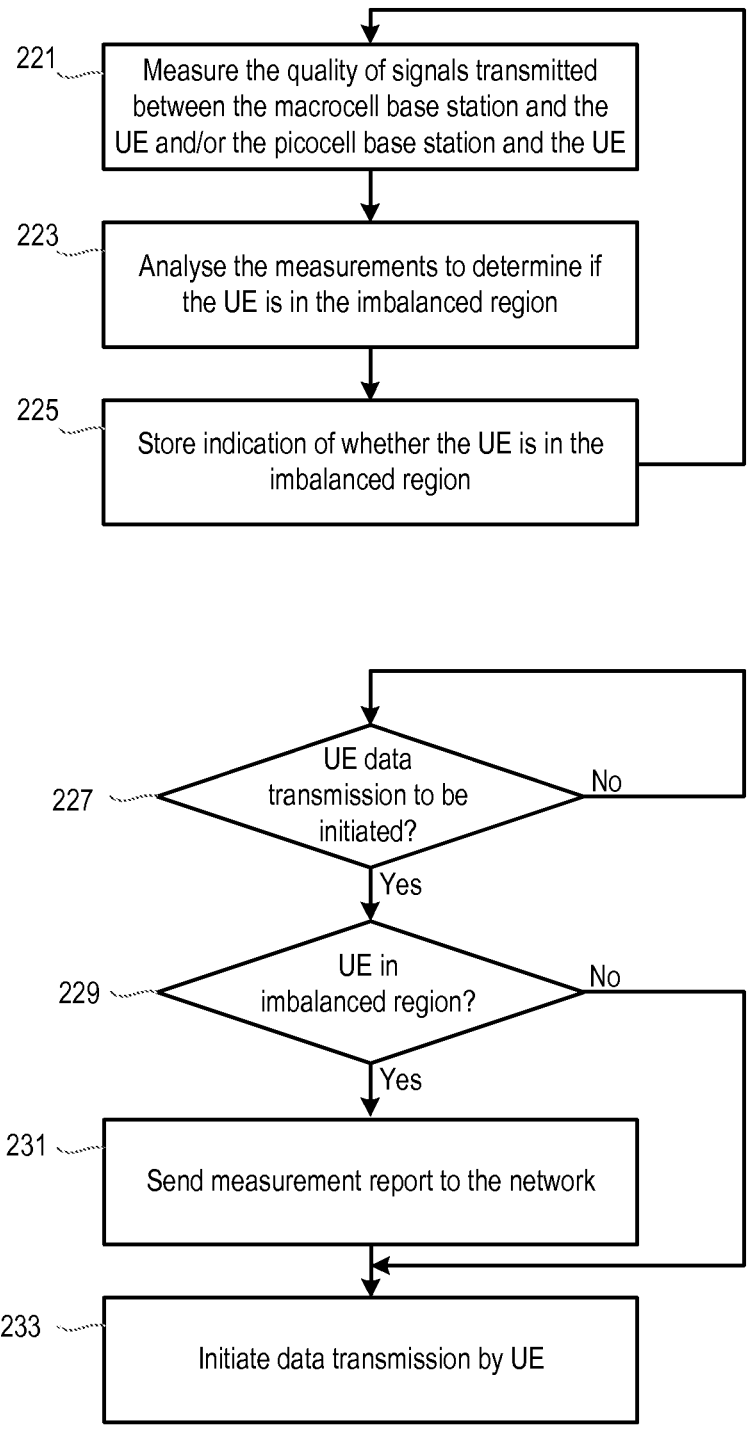
FIG. 12 is a flow chart illustrating a second specific method of operating a user equipment to determine whether the user equipment is in an imbalanced region or a part of an imbalanced region.

A method of operating a UE 14 according to a second method for determining whether the UE 14 is in the imbalanced region or a part of the imbalanced region is shown in FIG. 12. In this method, the operation of the UE 14 is shown as two processes, the first corresponding to steps 221-225 and the second corresponding to steps 227-233. These processes can operate generally simultaneously in the UE 14.

In step 221 of FIG. 12, the UE 14 measures the quality of signals transmitted between the UE 14 and one or more nearby base stations 4, 6. Step 221 can be implemented in the same way as step 201 of the first method shown in FIG. 11.

The signal quality measurements are then analysed in step 223 to determine if the UE 14 is in the specified region (i.e. the imbalanced region 16 or the range extension region). Again, this step can be implemented in the same way as step 203 above.

Then, in step 225, an indication of whether the UE 14 is in the specified region is stored in the memory module 36 of the UE 14. The method then returns to step 221 and repeats.

In the second process, beginning with step 227, it is determined whether a data transmission from the UE 14 is to be initiated. This data transmission may be the transmission of data by the UE 14 in a random access channel (RACH) or a transmission in response to a paging message sent to the UE 14 from the network 2. Step 227 repeats until there is data to be transmitted.

If a data transmission is to be initiated, the process moves to step 229 in which it is determined whether the UE 14 is in the specified region. In this step, the processing module 30 of the UE 14 can retrieve the indication stored in the memory module 36 in step 225 and determine from the indication if the UE 14 is in the specified region or not.

If the UE 14 is in the specified region, the process moves to step 231 in which the UE 14 sends a message to the network 2 to inform the network 2 that the UE 14 is in the specified region. This message can also indicate that the UE 14 is about to begin data transmission. As in the first method in FIG. 11, this message can be a measurement report that contains the signal quality measurements made by the UE 14 on the downlink signals from the picocell base station 4 and/or macrocell base station 6 (and optionally the signal quality measurements of any other nearby cells).

As described below with reference to FIG. 10, a node in the network 2 (for example the picocell base station 4, macrocell base station 6 or RNC 8) can process the signal quality measurements in the measurement report to determine whether the UE 14 is in the imbalanced region 16 or range extension region.

In alternative implementations, the transmission of the message itself can indicate to the network 2 that the UE 14 is in the specified region—i.e. the UE 14 can be configured to only send the message when it is in the imbalanced region 16 or range extension region and it is about to initiate data transmission.

Once the message or measurement report has been transmitted to the network 2, the method moves to step 233 in which the UE 14 initiates the data transmission.

If in step 229 it is determined that the UE 14 is not in the specified region, the method can move directly to step 233 in which the UE 14 initiates the data transmission (i.e. no specific message or measurement report is transmitted by the UE 14 in this case).

It will be appreciated that steps 231 and 233 (the sending of the measurement report to the network and the initiation of the data transmission by the UE respectively) can occur in the order shown in FIG. 12, or they can occur at the same or substantially the same time, or even in the opposite order to that shown in FIG. 12.

This method has the advantage that there is little increase in the signalling overhead as messages or measurement reports are only sent when really needed. However, where the UE 14 is only transmitting relatively small and/or infrequent amounts of data (for example when the UE 14 is in the CELL_FACH state, the report can be sent with, just before or just after the first data transmission, which means that the network 2 can determine whether to switch the UE 14 into the CELL_DCH state according to the methods shown in FIGS. 6 and 7 before any further data transmissions by the UE 14. For example, the inter-arrival time for uplink data relating to a web application in the UE 14 may be of the order of several seconds. The initial data transmission can be sent with the measurement report, and the network may initiate a switch into the CELL_DCH state to better serve the UE's subsequent data transmissions.

It will be appreciated that it is preferable to use traffic-activated triggers (the FIG. 12 method) for UEs 14 that are in the CELL_FACH state (in which it is more important to maintain a low signalling overhead and therefore only transmit a traffic activated trigger after the UE PRACH ramps up for UL transmissions and/or upon responding to paging to the UE 14 for DL transmissions). For a UE 14 in the CELL_FACH state, it is not certain that there will be any data transmission while the UE is in the imbalanced region or range extension region. However, an exception could be for UEs 14 that are in the CELL_FACH state that have ongoing data transmissions. In this case, the use of location-activated triggers (the method of FIG. 11) may be justified.

UEs 14 that are in the CELL_DCH state are largely synonymous with ongoing data transmissions (or imminent transmissions) and in this case it will be appreciated that it is preferred to use location-activated triggers (i.e. the FIG. 11 method) to guarantee the best performance. The added overhead from the trigger event reports is insignificant in comparison to the relatively large payload data that is required to be transmitted and/or received by the UE 14 for it to be in the CELL_DCH state in the first place. If a UE 14 becomes active while inside the imbalanced region 16 or range extension region and it switches from the CELL_FACH state up to CELL_DCH state, traffic activated triggering can be used instead (since the 'UE entered imbalanced region' measurement report in step 207 of FIG. 11 will not be triggered). Alternatively, after switching from the CELL_FACH state up to the CELL_DCH state, the UE 14 can continue using the location-activated triggers (in which case the UE 14 will operate from step 209 in FIG. 11).

It will be appreciated that a UE 14 can be configured to operate according to just one or both of the methods described above. In the latter cases, the UE 14 can be configured to select the method to use based on the current radio resource control (RRC) state of the UE 14 (i.e. CELL_FACH or CELL_ DCH).

Although in the methods described above the UE 14 determines whether it is in the imbalanced or range extension regions on the basis of measurements of the downlink signal quality from the picocell base station 4 and macrocell base station 6, it will be appreciated that it is possible to determine whether the UE 14 is in the specified region based on measurements of the quality of the uplink from the UE 4 to the picocell base station 4 and macrocell base station 6. In this case, pathgain measurements of UL transmissions from the UE 14 (e.g. the dedicated physical control channel, DPCCH, from the UE 14) can be made at both the picocell base station 4 and macrocell base station 6. The pathgain measurements could then be communicated to the UE 14 so that the UE 14 can determine whether it is in the imbalanced region 16 or range extension region using similar relationships to those defined in equations (3) and (4). It will be appreciated that this approach requires coordination between the picocell base station 4 and macrocell base station 6 (including making the non-serving base station aware of the scrambling code used by the UE 14 so that the non-serving base station can despread the UL transmission (e.g. DPCCH)).

As noted above, FIG. 10 shows a method of operating a node in the network 2 according to the above methods. The node could be any one or more of the lower-power (picocell) base station 4, higher-power (macrocell) base station 6 or RNC 8.

In the first step, step 195, the node receives a signal, for example a measurement report or other message, from a UE 14. Where the node is a base station 4, 6, the signal will be received wirelessly from the UE 14 using antenna(s) 44 and transceiver module 42. Where the node is an RNC 8, the signal will be received wirelessly from the UE 14 at one of the base stations 4, 6 and passed by that base station 4, 6 to the RNC 8 through the Iub interface.

In step 197, the node analyses the signal to determine whether the UE 14 is in a specified region (i.e. an imbalanced region or a range extension region) between the macrocell base station 6 and the picocell base station 4. The signal may comprise a measurement report or other message that has been transmitted by the UE 14 in accordance with the methods shown in FIGS. 11 and 12. In this case, the measurement report or message may comprise measurements of the quality of the downlink signals from the picocell base station 4 and/or macrocell base station 6 (or the measurements of pathgain G if calculated and/or used by the UE 14), this step can comprise the node determining whether the UE 14 is in the imbalanced or range extension region using one of the relationships defined in equations (1)-(5). Alternatively, where the UE 14 is configured to only transmit a particular measurement report in a specific situation (e.g. when the UE 14 has entered the imbalanced region, left the imbalanced region 16 or is in the imbalanced region 16 and is about to (or just has) transmit data), step 143 can comprise the node determining the type of measurement report received from the UE 14.

Alternatively, rather than operate according to the methods in FIG. 11 or 12, the UE 14 can be configured by the node (e.g. RNC 8) to periodically send measurement reports to the RNC 8 corresponding to the received CPICH power (CPICH RSCP) or computed pathloss values for the serving and neighbouring cells. In this case, the RNC 8 can process the CPICH RSCP measurements in the measurement reports according to any of equations (1)-(4) to determine whether the UE 14 is located in the imbalanced region 16 or the range extension region. In the case of pathloss measurements, if the pathloss to the macrocell base station 6 is greater than to the picocell base station 4 and the UE 14 is being served by the macrocell base station 6, then the UE 14 is in the imbalanced region 16.

In an alternative implementation, rather than the UE 14 determining whether it is in the imbalanced region 16 or range extension region, the node can make the determination based on measurements of the quality of UL transmissions from the UE 14 (e.g. measurements, such as the pathgain, of the dedicated physical control channel, DPCCH, from the UE 14). Where the node is one of the picocell base station 4 or macrocell base station 6, the signal received in step 195 will be the UL transmission from the UE 14, and the base station will determine the pathgain from the received signal. The base station will also receive a signal from the other one of the picocell base station 4 and macrocell base station 6 indicating the signal quality (e.g. pathgain) of the UL transmission at that base station. Step 197 can then comprise the base station determining whether the UE 14 is in the imbalanced region 16 or range extension region from the UL quality measurements using similar relationships to those defined in equations (3) and (4). Alternatively, where the node is the RNC 8, the signal received in step 141 can be a signal from one or both of the picocell base station 4 or macrocell base station 6 indicating the measurements of the quality of the uplink from the UE 14 by those base stations. Step 143 can then comprise the RNC 8 determining whether the UE 14 is in the imbalanced region 16 or range extension region from those measurements using similar relationships to those defined in equations (3) and (4). It will be appreciated that these approaches require coordination between the picocell base station 4 and macrocell base station 6 to exchange the UL quality measurement and for the base station serving the UE 14 to make the non-serving base station aware of the scrambling code used by the UE 14 so that the non-serving base station can despread the UL transmission (e.g. DPCCH).

The output of step 197 is then used in the methods shown in FIGS. 6 and 7.

It will be appreciated that, where the UE 14 is in the CELL_FACH state (i.e. the UE 14 can send small amounts of data to the network 2) and the UE 14 has data to send to the network 2, the UE 14 can send a measurement report or other signal to the macrocell base station 6 along with the data.

There is a further alternative implementation of step 197 in which the node determines whether the UE 14 is in the imbalanced region 16 or range extension region without requiring any specific action by the UE 14. In this alternative, both the macrocell base station 6 and picocell base station 4 listen for and record the time when the UE RACH ramps up (i.e. when they detect a RACH transmission from the UE). That is, when a UE 14 wants to initiate the transmission of data, it transmits a RACH preamble sequence, initially at a relatively low power. When the serving base station (e.g. the macrocell base station 6) receives the RACH preamble sequence, the serving cell responds with an acquisition indicator (AI) over an AICH (AI channel) which indicates the resources on the E-DCH to be used by the UE 14. If the UE 14 does not receive an AI in response to the transmission of a RACH preamble sequence, it retransmits the sequence at a higher power level. The UE 14 continues gradually increasing the power level of the transmitted RACH preamble sequence (called preamble ramping) until it receives a reply from the serving base station. In the imbalanced region 16, the pathloss to the picocell base station 4 will be less than the pathloss to the macrocell base station 6, so the picocell base station 4 should detect a RACH transmission from the UE 14 before the macrocell base station 6. Likewise, if the macrocell base station 6 hears the RACH transmission first, it is an indication that the UE 14 has left the imbalanced region 16. Thus, if the UE 14 has the macrocell as the serving cell but the picocell base station 4 hears the ramp up first (i.e. it detects a RACH preamble sequence transmitted at a lower power than the RACH preamble sequence detected by the macrocell base station 6), this is an indication to the network that the UE 14 is closer to the picocell base station 4 than to the macrocell base station 6 and is thus in the imbalanced region 16. To implement this, the non-serving base station can be informed of the set of RACH preamble sequences that are used by the serving base station, and the non-serving base station will be configured to perform RACH detection using these preamble sequences in addition to the regular RACH detection it does for UEs 14 associated with its own cell. This may require the non-serving base station to include components or other hardware in the form of correlators tuned to the serving cell preamble sequences. A low-latency connection between the base stations is also required so that the non-serving cell can signal to the serving cell when it hears the RACH ramp up.

Therefore, there is provided an improved way of managing the operation of mobile communication devices in an imbalanced region of a heterogeneous network, particularly for devices operating in the CELL_FACH state (or similar states in other types of mobile communication networks).

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a node in a mobile communication network, the network comprising a mobile device, a first base station and a second base station, the first base station having a lower transmission power than the second base station and being within the coverage area of the second base station, the method comprising:
    determining whether or not the mobile device is in an imbalanced region or a specified part of the imbalanced region between the first base station and the second base station, the imbalanced region comprising an area in which a downlink signal quality from the second base station to the mobile device is greater than a downlink signal quality from the first base station to the mobile device and an uplink signal quality from the mobile device to the first base station is greater than an uplink signal quality from the mobile device to the second base station; and
    determining whether to switch the mobile device between a first connection state and a second connection state based on the determination of whether or not the mobile device is located in the imbalanced region or the specified part of the imbalanced region;
    wherein the first connection state is a CELL_FACH state and the second connection state is a CELL_DCH state.

2. The method of claim 1, wherein determining whether to switch the mobile device comprises determining that the mobile device is to switch into the CELL_DCH state from the CELL_FACH state if the mobile device is located in the imbalanced region or the specified part of the imbalanced region.

3. The method of claim 1, further comprising:
    determining whether the mobile device has data to transmit in an uplink to one of the first base station and the second base station; and
    wherein the decision on whether to switch the mobile device between the first connection state and the second connection state is further based on whether the mobile device has data to transmit.

4. The method of claim 3, wherein determining whether to switch the mobile device comprises determining that the mobile device is to switch into the CELL_DCH state from the CELL_FACH state if the mobile device is located in the imbalanced region or the specified part of the imbalanced region and the mobile device has data to transmit.

5. The method of claim 1, further comprising:
    determining the amount of data the mobile device has to transmit in an uplink to one of the first base station and the second base station; and
    wherein the decision on whether to switch the mobile device between the first connection state and the second connection state is further based on the amount of data the mobile device has to transmit.

6. The method of claim 5, wherein determining whether to switch the mobile device comprises comparing the amount of data the mobile device has to transmit to a threshold, the threshold having a first value when the mobile device is located in the imbalanced region or the specified part of the imbalanced region and a second value when the mobile device is not located in the imbalanced region or the specified part of the imbalanced region.

7. The method of claim 5, wherein determining whether to switch the mobile device comprises comparing the amount of data the mobile device has to transmit to a threshold, the threshold having a first value when the mobile device is located in the imbalanced region or the specified part of the imbalanced region and a second value when the mobile device is not located in the imbalanced region or the specified part of the imbalanced region, the first value being lower than the second value.

8. The method of claim 1, wherein the decision on whether to switch the mobile device between the first connection state and the second connection state is further based on which of the first base station and the second base station the mobile device is camped on.

9. The method of claim 8, wherein determining whether to switch the mobile device comprises determining to switch the mobile device into the CELL_DCH state from the CELL_FACH state if the mobile device is determined to be located in the imbalanced region or the specified part of the imbalanced region and is camping on the cell served by the second base station.

10. A non-transitory computer-readable medium, comprising computer readable code stored thereon, the computer readable code being configured such that, on execution by a suitable computer or processor, the computer or processor is configured to perform the method claimed in claim 1.

11. A node for use in a mobile communication network that comprises a mobile device, a first base station and a second base station, the first base station having a lower transmission power than the second base station and being within the coverage area of the second base station, said node comprising a processing module configured to:
    determine whether or not the mobile device is in an imbalanced region or a specified part of the imbalanced region between the first base station and the second base station, the imbalanced region comprising an area in which a downlink signal quality from the second base station to the mobile device is greater than a downlink signal quality from the first base station to the mobile device and an uplink signal quality from the mobile device to the first base station is greater than an uplink signal quality from the mobile device to the second base station; and
    determine whether to switch the mobile device between a first connection state and a second connection state based on the determination of whether or not the mobile device is located in the imbalanced region or the specified part of the imbalanced region;
    wherein the first connection state is a CELL_FACH state and the second connection state is a CELL_DCH state.

12. The node of claim 11, wherein the processing module is configured to determine that the mobile device is to switch into the CELL_DCH state from the CELL_FACH state if the mobile device is located in the imbalanced region or the specified part of the imbalanced region.

13. The node of claim 11, wherein the processing module is further configured to determine whether the mobile device has data to transmit in an uplink to one of the first base station and the second base station; and wherein the processing module is configured to determine whether to switch the mobile device between the first connection state and the second connection state based on whether the mobile device has data to transmit and whether the mobile device is located in the imbalanced region or the specified part of the imbalanced region.

14. The node of claim 13, wherein the processing module is configured to determine that the mobile device is to switch into the CELL_DCH state from the CELL_FACH state if the mobile device is located in the imbalanced region or the specified part of the imbalanced region and the mobile device has data to transmit.

15. The node of claim 11, wherein the processing module is further configured to determine the amount of data the mobile device has to transmit in an uplink to one of the first base station and the second base station; and wherein the processing module is configured to determine whether to switch the mobile device between the first connection state and the second connection state based on the amount of data the mobile device has to transmit and whether the mobile device is located in the imbalanced region or the specified part of the imbalanced region.

16. The node of claim 15, wherein the processing module is configured to determine whether to switch the mobile device between the first connection state and the second connection state by comparing the amount of data the mobile device has to transmit to a threshold, the threshold having a first value when the mobile device is determined to be located in the imbalanced region or the specified part of the imbalanced region and a second value when the mobile device is not determined to be located in the imbalanced region or the specified part of the imbalanced region.

17. The node of claim 15, wherein the processing module is configured to compare the amount of data the mobile device has to transmit to a threshold to determine whether to switch the mobile device from the CELL_FACH state to the CELL_DCH state, the threshold having a first value when the mobile device is determined to be located in the imbalanced region or the specified part of the imbalanced region and a second value when the mobile device is not determined to be located in the imbalanced region or the specified part of the imbalanced region, the first value being lower than the second value.

18. The node of claim 11, wherein the processing module is further configured to determine whether the mobile device is to switch between the first connection state and the second connection state based on which of the first base station and the second base station the mobile device is camped on.

19. The node of claim 18, wherein the processing module is configured to determine that the mobile device is to switch into the CELL_DCH state from the CELL_FACH state if the mobile device is determined to be located in the imbalanced region or the specified part of the imbalanced region and is camping on the cell served by the second base station.

20. The node of claim 11, wherein the node controls the first base station and the second base station, such as a radio network controller.

* * * * *

UNITED STATES PATENT AND TRADEMARK OFFICE
CERTIFICATE OF CORRECTION

| | | |
|---|---|---|
| PATENT NO. | : 8,953,526 B2 | Page 1 of 1 |
| APPLICATION NO. | : 13/703904 | |
| DATED | : February 10, 2015 | |
| INVENTOR(S) | : Grant et al. | |

It is certified that error appears in the above-identified patent and that said Letters Patent is hereby corrected as shown below:

In the Specification

In Column 1, Line 39, delete "device 12" and insert -- device 14 --, therefor.

In Column 2, Line 27, delete "QOffset2" and insert -- QOffset2sn --, therefor.

In Column 2, Lines 55-56, delete "channel-E-HIGH)." and insert -- channel-E-HICH). --, therefor.

Signed and Sealed this
Twenty-eighth Day of July, 2015

Michelle K. Lee
*Director of the United States Patent and Trademark Office*